US012305294B2

(12) United States Patent
Park et al.

(10) Patent No.: US 12,305,294 B2
(45) Date of Patent: May 20, 2025

(54) COMPOSITION FOR SURFACE TREATMENT OF Mg-CONTAINING GALVANIZED STEEL SHEET AND Mg-CONTAINING GALVANIZED STEEL SHEET SURFACE-TREATED USING SAME

(71) Applicant: POSCO, Pohang-si (KR)

(72) Inventors: Young-Jun Park, Gwangyang-si (KR); Yong-Woon Kim, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 871 days.

(21) Appl. No.: 17/271,353

(22) PCT Filed: Aug. 16, 2019

(86) PCT No.: PCT/KR2019/010439
§ 371 (c)(1),
(2) Date: Feb. 25, 2021

(87) PCT Pub. No.: WO2020/045869
PCT Pub. Date: Mar. 5, 2020

(65) Prior Publication Data
US 2021/0348280 A1     Nov. 11, 2021

(30) Foreign Application Priority Data
Aug. 31, 2018    (KR) .......................... 10-2018-0103752

(51) Int. Cl.
*C23C 30/00*    (2006.01)
*C08F 2/22*     (2006.01)
(Continued)

(52) U.S. Cl.
CPC .............. *C23C 30/005* (2013.01); *C09D 5/08* (2013.01); *C09D 127/16* (2013.01);
(Continued)

(58) Field of Classification Search
CPC .......................... C08F 214/205; C08F 220/06
See application file for complete search history.

(56) References Cited

U.S. PATENT DOCUMENTS 4,098,972 A * 7/1978 Ogawa .................... B05D 7/227
                                                        526/74
4,118,357 A * 10/1978 Brabetz ................. C08F 261/04
                                                        524/503
(Continued)

FOREIGN PATENT DOCUMENTS

CN    107620063     1/2018
CN    108219601     6/2018
(Continued)

OTHER PUBLICATIONS

International Search Report—PCT/KR2019/010439 dated Nov. 19, 2019.
(Continued)

*Primary Examiner* — Joseph D Anthony
(74) *Attorney, Agent, or Firm* — CANTOR COLBURN LLP

(57) ABSTRACT

Provided is a composition for surface treatment of an Mg-containing galvanized steel sheet comprising a trivalent chromium compound, a carboxylated vinylidene copolymer, and a cross-linking agent. The composition for surface treatment forms a chromium (III) film and is also cross-linked in coating and drying of the surface of a galvanized steel sheet, thereby forming a three-dimensional compact molecular structure. Thus, a galvanized steel sheet coated with the composition has a coating film with high ductility, and can reduce moisture and/or oxygen permeability such that, not only does a worked section have excellent corrosion resistance, but also the occurrence of darkening and/or black dots can be prevented even when exposed to high-tempera-
(Continued)

ture and high-humidity environment for a long period of time.

5 Claims, 2 Drawing Sheets

(51) Int. Cl.
| | | |
|---|---|---|
| C09D 5/08 | (2006.01) | |
| C09D 127/16 | (2006.01) | |
| C09K 15/32 | (2006.01) | |
| C23C 2/26 | (2006.01) | |
| C25D 3/56 | (2006.01) | |
| C25D 5/48 | (2006.01) | |
| C08F 214/22 | (2006.01) | |

(52) U.S. Cl.
CPC .............. *C09K 15/326* (2013.01); *C23C 2/26* (2013.01); *C25D 3/56* (2013.01); *C25D 5/48* (2013.01); *C08F 2/22* (2013.01); *C08F 214/225* (2013.01); *C23C 2222/10* (2013.01)

(56) References Cited

U.S. PATENT DOCUMENTS

| | | | |
|---|---|---|---|
| 5,252,363 A | 10/1993 | Anderson | |
| 6,037,124 A | 3/2000 | Matson | |
| 2013/0231428 A1 | 9/2013 | Dandenault et al. | |
| 2014/0011048 A1 | 1/2014 | Kwak et al. | |
| 2015/0147501 A1* | 5/2015 | Lindenmuth | C09D 7/65 |
| | | | 428/220 |
| 2016/0002753 A1 | 1/2016 | Shiragaki et al. | |
| 2018/0216234 A1* | 8/2018 | Westre | C23C 22/08 |
| 2019/0264333 A1 | 8/2019 | Cho et al. | |
| 2019/0264334 A1 | 8/2019 | Cho et al. | |

FOREIGN PATENT DOCUMENTS

| | | |
|---|---|---|
| EP | 0264655 | 4/1988 |
| GB | 1307859 A | 2/1973 |
| JP | S60186854 | 9/1985 |
| JP | S63113559 | 5/1988 |
| JP | H03254859 | 11/1991 |
| JP | H08012919 | 1/1996 |
| JP | H09501350 | 2/1997 |
| JP | H09165686 | 6/1997 |
| JP | H10330625 | 12/1998 |
| JP | 2000302821 | 10/2000 |
| JP | 2004067716 | 3/2004 |
| JP | 2014198800 | 10/2014 |
| JP | 2017115102 | 6/2017 |
| KR | 19900009037 | 12/1990 |
| KR | 100705531 | 4/2007 |
| KR | 100775662 | 11/2007 |
| KR | 20130026150 | 3/2013 |
| KR | 101262497 | 5/2013 |
| KR | 20150075001 | 7/2015 |
| KR | 101586840 | 1/2016 |
| KR | 101758474 | 7/2017 |
| KR | 101786358 | 10/2017 |
| KR | 101786392 | 10/2017 |
| WO | 9504606 | 2/1995 |
| WO | 2000039169 | 7/2000 |
| WO | WO-2017217750 A1 * | 12/2017 ............... C09D 5/08 |
| WO | WO-2018070720 A1 * | 4/2018 ............... C09D 4/00 |

OTHER PUBLICATIONS

Kim, et al., Environment-friendly Trivalent Chromate Treatment for Zn Electroplating, J. Korean Ind. Eng. Chem., Oct. 2006, vol. 17, No. 5, pp. 433-442.

Lovell, et al., Emulsion Polymerization and Emulsion Polymer, Mar. 1997, pp. 498-500.

Lytle, et al., An Investigation of The Structure and Chemistry of a Chromium-Conversion Surface Layer on Aluminum, Corrosion Science, 1995, vol. 37, No. 3, pp. 349-369.

Chinese Office action—Chinese Application No. 201980056847.2 issued on Aug. 10, 2021, citing KR 10-1786358, JP 2000-302821, CN 107620063, and CN 108219601.

EP Extended Search Report issued Nov. 12, 2021 re: Application No. PCT/KR2019/010439, pp. 1-9, citing: GB 1 307 859 A.

* cited by examiner

COMPOSITION FOR SURFACE TREATMENT OF Mg-CONTAINING GALVANIZED STEEL SHEET AND Mg-CONTAINING GALVANIZED STEEL SHEET SURFACE-TREATED USING SAME

TECHNICAL FIELD

The present disclosure relates to a composition for surface treatment of a Mg-containing galvanized steel sheet and a Mg-containing galvanized steel sheet, surface treated with the composition, and more particularly, to a surface treatment composition for preventing the occurrence of white rust and blackening on a processed portion of a Mg-containing galvanized steel sheet and a Mg-containing galvanized steel sheet, surface treated with the surface treatment composition.

BACKGROUND ART

Mg-containing galvanized steel sheets have merits such as high-speed production, high corrosion resistance, and high economical efficiency compared to conventional plated steel sheets. However, since Mg is highly reactive, the surfaces of Mg-containing galvanized steel sheet products may be blacked by reaction with moisture.

As a technique for improving corrosion resistance, blackening resistance, and processed-portion corrosion resistance of alloy plated steel sheets containing Mg in the plating layers thereof, water-soluble coating compositions containing an olefin resin, an organic silane, a blackening inhibitor, an inorganic metal rust inhibitor, and the like have been proposed (Korean Patent No. 10-1586840, Korean Patent No. 10-1262497, etc.). However, the olefin resin, which occupies most of the constituent materials of a coating layer, has high moisture and/or oxygen permeability, and thus the fundamental and important requirement, that is, the ability to suppress the occurrence of blackening and black spots is not guaranteed.

In addition, there is a technique (Korean Patent No. 10-1786392) for improving corrosion resistance, blackening resistance, and processed-portion corrosion resistance by using a coating composition containing a water-soluble cationic urethane resin, chromium phosphate, etc., but the water-soluble cationic urethane resin alone does not guarantee blackening resistance because of high water permeability thereof, thereby requiring additional addition of many auxiliary materials such as a silane-based sol-gel resin, a rust-preventing agent, a silane coupling agent, and an Al compound.

In addition, as a technique for preventing moisture-induced blackening of Mg metal plates, there is a technique (Korean Patent No. 10-1758474) of forming an inorganic coating layer on a Mg metal plate by coating the Mg metal plate with a composition containing a siloxane precursor in the presence of atmospheric plasma, and forming an organic coating layer by coating an upper side of the inorganic coating layer with a composition containing a polyvinylidene-based polymer. However, since the coating layer is composed of only the polyvinylidene-based polymer which is not crosslinked, the coating layer has higher moisture and oxygen permeability than a coating layer composed of a crosslinked polyvinylidene-based polymer, resulting in blackening and black spots. In addition, the use of an organic solvent is inevitable to prepare the polyvinylidene-based polymer as a coating solution having fluidity.

Examples of patents relating to a polyvinylidene resin containing a carboxyl group include U.S. Pat. No. 6,037,124 (Carboxylated polyvinylidene fluoride solid supports for the immobilization of biomolecules and methods of use thereof), US Patent Publication No. 2013-0231428 (FAST FILM FORMATION WATER BASED BARRIER COATING), etc., but there is no patent relating to crosslinking and improvements in the corrosion resistance and blackening resistance of plated steel sheets containing Mg.

In the related art, Mg-containing steel sheets are coated with a solution in which a polyvinylidene-based polymer is dissolved in an organic solvent so as to prevent the permeation of moisture and oxygen. However, this method results in environmental pollution problems due to the organic solvent, and since the polyvinylidene-based polymer is not crosslinked, chemical resistance is insufficient, and there is a limit to decreasing moisture and oxygen permeability.

In addition, an emulsifier is used to synthesize a polyvinylidene polymer (copolymer) by emulsion (co)polymerization. However, a coating layer, formed by coating a plated steel sheet with a dispersion in which a polyvinylidene polymer (copolymer) synthesized as described above is dispersed, is vulnerable to moisture due to an emulsifier containing a low-molecular-weight salt and undergoes yellowing when exposed to a high-temperature, high-humidity environment for a long time (ref. Emulsion Polymerization and Emulsion Polymers, by Peter A. Lovell (Editor), Mohamed S. El-Aasser (Editor), March 1997).

PRIOR-ART DOCUMENTS

Patent Documents

[Patent Document 1] Korea Patent No. 10-1262497
(Patent Document 2) Korea Patent No. 10-1786392
(Patent Document 3) Korea Patent No. 10-1758474
(Patent Document 4) U.S. Pat. No. 6,037,124
(Patent Document 5) US Patent Publication No. 2013-0231428

Non-Patent Documents (Non-Patent Document 1) Emulsion Polymerization and Emulsion Polymers, by Peter A. Lovell (Editor), Mohamed S. El-Aasser (Editor), March 1997

DISCLOSURE

Technical Problem

To solve the above problems, the present disclosure provides a composition including a trivalent chromium compound for surface treatment of a Mg-containing galvanized steel sheet, and a Mg-containing galvanized steel, surface treated with the composition.

Technical Solution

An embodiment of the present disclosure provides a composition for surface treatment of a Mg-containing galvanized steel sheet, the composition including a trivalent chromium compound, a carboxylated vinylidene copolymer, and a crosslinking agent.

The carboxylated vinylidene copolymer is prepared by copolymerization between a vinylidene-based monomer and a monomer having a carboxyl group, and the copolymerization may be surfactant-free emulsion copolymerization.

The trivalent chromium compound is included in the composition in an amount of 10 wt % to 20 wt %.

The carboxylated vinylidene copolymer is included in an amount of 5 wt % to 10 wt % based on a solid content of the composition.

The crosslinking agent is included in an amount of 1 wt % to 5 wt % based on a solid content of the carboxylated vinylidene copolymer.

The vinylidene-based monomer is included in an amount of 10 wt % to 15 wt % based on an emulsion copolymer material, and the monomer having a carboxy group is included in an amount of 0.5 wt % to 1.5 wt % based on the vinylidene-based monomer.

Another embodiment of the present disclosure provides A galvanized steel sheet including: a steel sheet including a galvanized layer; and a surface coating layer formed on the galvanized layer by using a composition which includes a trivalent chromium compound, a carboxylated vinylidene copolymer, and a crosslinking agent, wherein the galvanized layer includes Mg.

Mg is included in an amount of 0.5 wt % to 5 wt % based on the galvanized layer, and the dried weight of the surface coating layer on the galvanized layer is 200 mg/m$^2$ to 500 mg/m$^2$, and the composition is dried at a temperature of 100° C. to 200° C. for 5 seconds to 30 seconds.

The galvanized steel sheet has an anti-blackening ability of $\Delta E \leq 3$ after being maintained at a temperature of 50° C. and a relative humidity of 95% for 120 hours, and white rust appears on less than 5% of a processed portion of the galvanized steel sheet in 36 hours after salt water is sprayed on the processed portion.

Advantageous Effects

The surface treatment composition of the present disclosure forms a trivalent chromium coating layer with a three-dimensional dense molecular structure as being crosslinked while being coated and dried on the surface of a plated steel sheet. Therefore, the surface treatment composition can improve processed-portion corrosion resistance and prevent the occurrence of blackening and/or block spots in spite of long-period exposure to high-temperature, high-humidity environment because the surface treatment composition forms a coating layer having high ductility and low moisture and/or oxygen permeability compared to conventional coating materials which form a coating layer of only a trivalent chromium, a coating layer of a mixture of trivalent chromium, non-crosslinked polyurethane, and many organic rust-preventing components, or a coating layer of a polyvinylidene-based polymer. In addition, since the coating composition of the present disclosure contains no organic solvent, the coating composition is eco-friendly.

Therefore, a plated steel sheet having a coating layer formed of the surface treatment composition of the present disclosure may have high processed-portion corrosion resistance and may not be stained by blackening or block spots. In particular, even when exposed to a high-temperature and high-humidity environment, the plated steel sheet may maintain good physical properties such as high processed-portion corrosion resistance and an ability to suppress the occurrence of blackening and/or black spots.

BEST MODE

Figure 1:
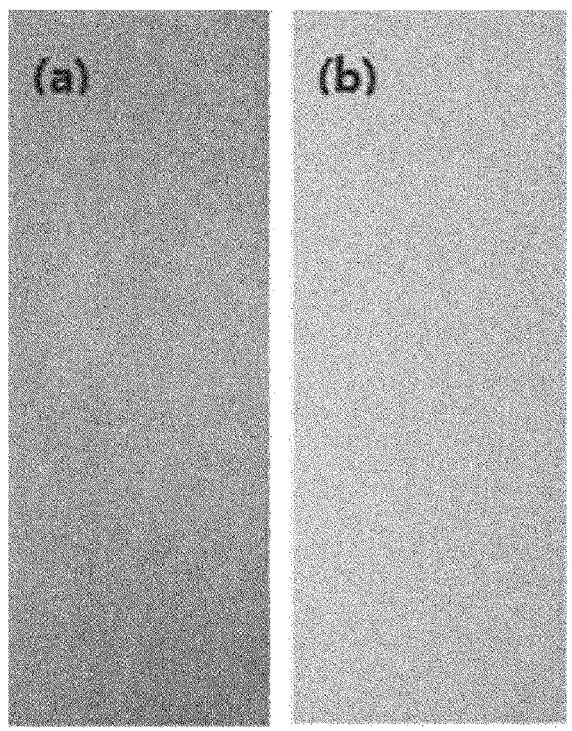
FIG. 1 is images of steel sheets which were coated with a surface treatment composition of the present disclosure and a conventional coating material and were kept at a temperature of 50° C. and a relative humidity of 95% for 120 hours so as to evaluate blackening of the steel sheets. (a) illustrates a comparative example, and (b) illustrates an inventive example.

Hereinafter, preferred embodiments of the present disclosure will be described. However, embodiments of the present disclosure may be modified in various other forms, and the scope of the present disclosure is not limited to the embodiments described below.

In general, a Mg-containing plating layer is formed on the surface of a steel sheet to improve the corrosion resistance of the steel sheet. However, Mg-containing plating layers are more brittle than plating layers which do not contain Mg, and may thus have poor processed-portion corrosion resistance. In addition, Mg oxide may be intensively formed on the top surface (surface directly making contact with air) of a Mg-containing plating layer, and thus the Mg-containing plating layer may easily be in contact with moisture and/or oxygen contained in the air, thereby causing blackening and/or black spots due to incomplete oxidation and corrosion. Thus, a plating layer may be blocked using a coating layer which has low moisture and/or oxygen permeability and thus blocks moisture and/or oxygen, and in this case, the corrosion of Mg oxide present on the top surface of the plating layer may be prevented, thereby suppressing the occurrence of blackening/black spots. Therefore, in the present disclosure, a coating layer is formed on a Mg-containing plating layer by coating the Mg-containing plating layer with a steel sheet coating composition in order to improve the processed-portion corrosion resistance of the Mg-containing plating layer and prevent the occurrence of blackening and/or black spots.

An embodiment of the present disclosure provides a composition including a trivalent chromium compound, a carboxylated vinylidene copolymer, and a crosslinking agent for surface treatment of a Mg-containing galvanized steel sheet. In the composition, the carboxyl group of the carboxylated vinylidene copolymer reacts with the crosslinking agent dispersible in water, such that a coating layer of the composition formed on a plated steel sheet may not have defects such as holes and may minimize the permeation of water owing to sufficient crosslinking of the composition. Therefore, even when a Mg-containing galvanized steel sheet coated with the composition is exposed to a high-temperature, high-humidity environment, the occurrence of blackening and black spots may be minimized.

In the present disclosure, the trivalent chromium compound may include chromium phosphate or chromium nitrate and may be prepared by reducing the chromium phosphate or chromium nitrate with ammonium sulfide or a hydrogen peroxide solution.

The trivalent chromium compound is included in an amount of 10 wt % to 20 wt % based on the solid content of the composition for surface treatment of a steel sheet. When the content of the trivalent chromium compound contained in the composition is less than 10 wt %, corrosion resistance is insufficient, and when the content of the trivalent chromium compound contained in the composition exceeds 20 wt %, the storage stability of the coating composition deteriorates.

According to the present disclosure, the composition for surface treatment of a steel sheet includes a water-dispersible polyvinylidene-based polymer having low moisture and/or oxygen permeability. The water-dispersible polyvinylidene-based polymer includes a carboxyl group in the molecule and may be prepared by surfactant-free emulsion copolymerization between a vinylidene-based monomer and a monomer having a carboxyl group. In the present specification, a compound prepared by the copolymerization is referred to as a carboxylated vinylidene copolymer.

In the present disclosure, the carboxylated vinylidene copolymer is included in an amount of 5 wt % to 10 wt % based on the solid content of the composition for surface treatment of a steel sheet. If the content of the carboxylated vinylidene copolymer is less than 5 wt %, the content of a polymer material included in the coating composition is low, and thus the thickness of a coating layer may be small, thereby decreasing the corrosion resistance of processed portions. In addition, a steel sheet may have to be coated with the composition containing a large amount of water to obtain a coating layer having an intended thickness, and in this case, when the coating layer is dried, holes may be formed due to a boiling phenomenon such that blackening of a plating layer under the coating layer may not be prevented. Conversely, if the content of the carboxylated vinylidene copolymer exceeds 10 wt %, dispersion stability in water is poor, and thus gelation may easily occur.

As described above, the carboxylated vinylidene copolymer of the present disclosure is prepared by surfactant-free emulsion copolymerization between a vinylidene-based monomer and a monomer having a carboxyl group. In the case in which a coating layer is formed on the surface of a plated steel sheet by using the surface treatment composition prepared through emulsion copolymerization, defects may not be formed due to a remaining surfactant.

The carboxylated vinylidene copolymer is dispersible in water such that an organic solvent may not be used in the composition for surface treatment of a steel sheet, and thus the composition for surface treatment of a steel sheet may be eco-friendly.

For example, the vinylidene-based monomer may include, but is not limited thereto, at least one selected from the group consisting of vinylidene fluoride, vinylidene chloride, vinylidene fluoride-co-hexafluoropropylene, vinylidene chloride-co-acrylonitrile, vinylidene chloride-co-acrylonitrile-co-methyl methacrylate, vinylidene chloride-co-vinyl chloride, and vinylidene chloride-co-methyl acrylate. The listed materials may be used alone or in combination of two or more as needed. A polymer synthesized from the vinylidene-based monomer has low moisture and/or oxygen permeability.

In the surfactant-free emulsion copolymerization between the vinylidene-based monomer and the monomer having a carboxyl group, the vinylidene-based monomer may be added in an amount of 10 wt % to 15 wt % based on the total weight of the reactants of the surfactant-free emulsion copolymerization, that is, based on the total weight of the vinylidene-based monomer and the monomer having a carboxyl group. If the content of the vinylidene-based monomer is less than 10 wt %, the content of a polymer material included in the composition for surface treatment is low, and thus a large amount of the composition may have to be used to coat a plated steel sheet for obtaining a coating layer having a desired thickness. In this case, since a large amount of water is applied to the coating layer, holes may be formed due to a boiling phenomenon when the coating layer is dried, and thus blackening of a plating layer under the coating layer may not be prevented due to the holes. In addition, moisture and/or oxygen may not be sufficiently blocked by the polymer material, and since the amount of the monomer having a carboxyl group is relatively large, a large amount of polymer electrolyte may be formed in the aqueous phase during the copolymerization to result in poor dispersion stability in water. If the content of the vinylidene-based monomer exceeds 15 wt %, since no surfactant is used in the emulsion copolymerization, the carboxylated vinylidene copolymer may have low dispersion stability in water and may thus be easily gelated.

For example, the monomer containing a carboxy group may include, but is not limited thereto, at least one selected from the group consisting of acrylic acid, methacrylic acid, crotonic acid, 2-ethylacrylic acid, 2-pentenic acid, 4-pentenic acid, 2-propylacrylic acid, 2-octenoic acid, 3-vinylbenzoic acid, 4-vinylbenzoic acid, 2-carboxyethylacrylate trans-3-benzoylacrylic acid, 2-bromoacrylic acid, and 2-bromomethyl-acrylic acid. The listed materials may be used alone or in combination of two or more as needed.

The monomer having a carboxyl group is emulsion copolymerized with the vinylidene-based monomer to improve the water dispersion stability of the carboxylated vinylidene copolymer, and while the coating layer is dried and cured, the monomer having a carboxyl group reacts with the crosslinking agent such that the coating layer may have a dense network structure.

In the surfactant-free emulsion copolymerization between the vinylidene-based monomer and the monomer containing a carboxyl group, the monomer having a carboxy group may be preferably added in an amount of 0.5 wt % to 1.5 wt % based on the amount of the vinylidene-based monomer. If the content of the monomer having a carboxyl group is less than 0.5 wt %, the carboxylated vinylidene copolymer may have low water dispersion stability and a small number of sites capable of reacting with the crosslinking agent such that the coating layer may not have a dense network structure. If the content of the monomer having a carboxyl group exceeds 1.5 wt %, a large amount of polymer electrolyte may be formed in the aqueous phase while the carboxylated vinylidene copolymer is prepared, and thus the carboxylated vinylidene copolymer may have poor dispersion stability in water.

Water is used in the emulsion copolymerization in addition to the vinylidene-based monomer and the monomer having a carboxyl group. Water that is generally used in emulsion copolymerization may be used in the emulsion copolymerization without limitations, and preferably, distilled water, tap water, deionized water, pure water, ultrapure water, or the like may be used. In addition, other additives such as a polymerization initiator which are generally used may be used in the emulsion copolymerization as needed. Such additives are common in the art, and thus detailed descriptions thereof are not presented in the present specification.

Methods of preparing the carboxylated vinylidene copolymer by surfactant-free emulsion copolymerization are generally known in the art, and any surfactant-free emulsion copolymerization method known in the art may be used. Therefore, the conditions such as temperature and time of the surfactant-free emulsion copolymerization, additives used in the surfactant-free emulsion copolymerization, and the like are not described in the present specification, and the present disclosure is not limited thereto. A carboxylated vinylidene copolymer prepared by any method known in the art may be included in the surface treatment composition of the present disclosure.

According to the present disclosure, the composition for surface treatment of a galvanized steel sheet includes the crosslinking agent (hardening agent) dispersible in water. For example, the water-dispersible crosslinking agent usable in the composition may include, but is not limited thereto, at least one selected from the group consisting of aziridine, an isocyanate compound, and a carbodiimide compound. A specific example of the aziridine may be CROSSLINKER CX100 (DSM Chemical), a specific example of the isocyanate compound may be Bayhydur (Covestro Chemical), and a specific example of the carbodiimide may be STAHL EVO Permutex (Stahl). However, the present disclosure is not limited thereto.

The water-dispersible crosslinking agent may be included in an amount of 1 wt % to 5 wt %, and preferably in an amount of 1 wt % to 3 wt %, based on the weight of the carboxylated vinylidene copolymer. While the surface treatment composition is applied to a Mg-containing galvanized steel sheet and is then dried and cured, the water-dispersible crosslinking agent reacts with the carboxyl group present on the surface of the carboxylated vinylidene copolymer as shown in the formula 1, thereby forming a dense three-dimensional coating layer and blocking moisture and/or oxygen. If the content of the water-dispersible crosslinking agent is less than 1 wt %, the amount of crosslinking agent is insufficient for a curing reaction to result in insufficient crosslinking, and if the content of the water-dispersible crosslinking agent exceeds 5 wt %, a surplus portion of the water-dispersible crosslinking agent that does not participate in a crosslinking reaction may remain as an impurity in the coating layer, causing defects and lowering the moisture blocking effect.

Formula 1

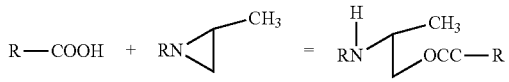

The composition for surface treatment of a steel sheet of the present disclosure may further include water. For example, tap water, pure water, ultrapure water, distilled water, deionized water, or the like may be used, but the present disclosure is not limited thereto.

In addition, if necessary, the composition for surface treatment of a steel sheet may include additives such as an adhesion promoter, a rust inhibitor, a lubricant, and an antifoaming agent which are generally added to surface treatment compositions for steel sheets in the art.

The composition for surface treatment of a steel sheet of the present disclosure is prepared by mixing the trivalent chromium compound including chromium phosphate with the carboxylated vinylidene copolymer, the water-dispersible crosslinking agent, and water, and a method of preparing the composition is not limited.

The composition for surface treatment of a steel sheet of the present disclosure may be applied to a steel sheet having a Mg-containing plating layer and may then be dried to form a coating layer on the surface of the steel sheet, thereby improving the processed-portion corrosion resistance of the steel sheet, decreasing the moisture and/or oxygen permeability of the steel sheet, and preventing the occurrence of blackening and black spots.

Another embodiment of the present disclosure provides a Mg-containing galvanized steel sheet, surface treated with a composition including a trivalent chromium compound, a carboxylated vinylidene copolymer, and a crosslinking agent.

The present disclosure is to prevent a decrease in processed-portion corrosion resistance and the occurrence of blackening and/or black spots which are caused by Mg contained in a plating layer, and thus the present disclosure may be unlimitedly applied to any plated steel sheet having a Mg-containing plating layer. The plating layer for improving the corrosion resistance of the steel sheet may include Mg in an amount of 0.5 wt % to 5 wt %, and preferably in an amount of 1.5 wt % to 3 wt %. If the content of Mg in the plating layer exceeds 5 wt %, it may be difficult to manufacture a plating bath because of oxidation of the surface of the plating bath, and if the content of Mg is less than 0.5 wt %, the effect of improving corrosion resistance may be too small.

The other materials of the plating layer may be any materials known in the art, and for example, the other materials of the plating layer may be Zn and Al but are not limited thereto.

Specifically, the plated steel sheet having a Mg-containing plating layer may be a galvanized steel sheet, more specifically, a galvanized steel sheet having a ternary plating layer of Mg/Al/Zn. More specifically, the plating layer may include: Mg in an amount of 0.5 wt % to 5 wt %, preferably 1.5 wt % to 3 wt %; Al in an amount of 1.5 wt % to 11 wt %; and the balance of Zn.

Any coating method known in the art such as dip coating, bar coating, roll coating, or spray coating may be unlimitedly used as a method of coating the plated steel sheet having a Mg-containing plating layer with the steel sheet coating composition of the present disclosure.

Furthermore, in the present disclosure, the amount of coating is within the range of 200 mg/m² to 500 mg/m² in dried weight. If the dried coating weight is less than 200 mg/m², corrosion resistance and moisture and/or oxygen blocking may be insufficient, and thus blackening may easily occur. If the dried coating weight is greater than 500 mg/m², resin separation may occur during a pipe manufacturing process, or weldability may deteriorate.

The steel sheet coating composition of the present disclosure may be applied to one or both sides of the plated steel sheet having a Mg-containing plating layer.

The steel sheet coating composition of the present disclosure is coated on the plated steel sheet having a Mg-containing plating layer and is then dried. The steel sheet coating composition may be dried by any method known in the art and/or under any conditions known in the art without limitations. For example, the steel sheet coating composition may be dried at a temperature of 100° C. to 200° C. for about 5 seconds to about 30 seconds to form a coating layer on the plated steel sheet. The steel sheet coating composition may be crosslinked as being dried at the above-mentioned temperature for the above-mentioned time period, thereby forming a three-dimensional dense molecular structure.

During the coating and drying processes, a trivalent chromium coating layer is formed, and at the same time, a three-dimensional dense molecular structure is formed according to the present disclosure by crosslinking between the carboxylated vinylidene copolymer, water-dispersible and has a carboxyl group in the molecular structure, and the crosslinking agent (curing agent), water-dispersible and is capable of reacting with the carboxyl group. Therefore, moisture and/or oxygen permeability is lowered, and the occurrence of blackening and and/or black spots is prevented even when the plated steel sheet is exposed to a high-temperature, high-humidity environment for a long time. In addition, since no organic solvent is included in the coating composition, the coating composition is eco-friendly.

MODE FOR INVENTION

Examples

Hereinafter, examples of the present disclosure will now be described in detail. The following examples are only for helping understanding the present disclosure and are not intended to limit the scope of the present disclosure.

Inventive Example 1

(1) Preparation of a Carboxylated Vinylidene Emulsion Copolymer 10 g of vinylidene fluoride and 0.1 g of acrylic acid were added to 89.87 g of distilled water, and the mixture was heated to about 30° C. Then, while stirring the mixture at a rate of 200 rpm, 0.02 g of potassium peroxysulphate and 0.01 g of sodium bisulfite were added to the mixture to allow emulsion copolymerization for about 5 hours, thereby preparing a carboxylated vinylidene fluoride emulsion copolymer dispersion with a conversion rate of 99.5% or more.

At that time, the size of particles of a prepared polymer was within the range of 0.1 μm to 0.5 μm.

(2) Preparation of a Composition for Surface Treatment of a Mg-Containing Plated Steel Sheet 0.05 g of aziridine crosslinking agent (brand name: CX-100 by DSM), 15 g of chromium phosphate (solid content: 100%) as a trivalent chromium compound, and 35 g of deionized water were added at room temperature to 50 g of the carboxylated vinylidene fluoride emulsion copolymer dispersion (solid content: 10 wt %) prepared in section (1) above, thereby preparing a composition for surface treatment of a steel sheet.

(3) Forming a Coating Layer on a Plated Steel Sheet

The composition for surface treatment of a steel sheet, which was prepared in section (2) above, was coated on a plated steel sheet having a ternary plating layer of Al—Mg—Zn by using a bar coater and was then dried in hot air. At that time, the coating weight was adjusted to be 300 mg/m².

2. Comparative Examples 1 to 4

Compositions including components as shown in Table 1 below for surface treatment of steel sheets were prepared in the same manner as in Inventive Example 1, and were coated on plated steel sheets each having a ternary plating layer of Al—Mg—Zn by using a bar coater and were then dried in hot air.

TABLE 1

| | Chromium phosphate (wt %) | Polymer Type | Polymer Content (wt %) | Cross-linking agent (wt %) | Deionized water (wt %) |
|---|---|---|---|---|---|
| Inventive Example 1 | 15 | carboxylated vinylidene resin | 5 | 0.06 | 79.94 |
| Comparative Example 1 | 15 | urethane resin | 5 | 0 | 80 |
| Comparative example 2 | 15 | urethane resin | 5 | 0.06 | 79.94 |
| Comparative example 3 | 15 | vinylidene resin | 6 | 0.06 | 78.94 |
| Comparative example 4 | 15 | carboxylated vinylidene resin | 5 | 0 | 80 |

3. Evaluation of the Anti-Blackening Ability of Coating Layers Formed on Plated Steel Sheets To evaluate the anti-blackening ability of the compositions prepared in the inventive example and the comparative examples, steel sheets which were surface treated with the compositions were inserted into a thermo-hygrostat maintained at an atmospheric temperature of 50° C. and a relatively humidity of 95%. After 120 hours, the occurrence of blackening was observed with the naked eye and a colorimeter. In that time, evaluation was performed according to the following grades.
 ○: ΔE≤3
 Δ: 3<ΔE≤4
 x: ΔE>4

4. Evaluation of Processed-Portion Corrosion Resistance

Specimens of the surface-treated steel sheets were pressed upward to a height of 6 mm by using an Erichsen tester, and the formation of white rust was evaluated in 36 hours after salt water was sprayed on the specimens. In that time, evaluation was performed according to the following grades.
 ○: white rust is less than 5%
 Δ: white rust is at least 5% but less than 10%
 x: white rust is 10% or more

TABLE 2

| | Anti-blackening | Processed-portion corrosion resistance |
|---|---|---|
| Inventive Example 1 | ○ | ○ |
| Comparative Example 1 | Δ | X |
| Comparative example 2 | X | X |
| Comparative example 3 | X | Δ |
| Comparative example 4 | ○ | Δ |

Figure 2:
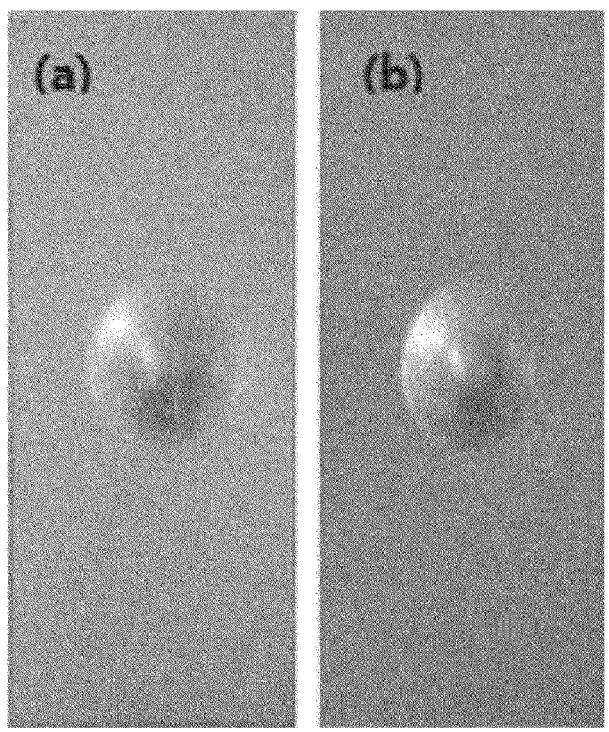
FIG. 2 is images of Mg-containing plated steel sheets which were coated with a surface treatment composition of the present disclosure and a conventional coating material and were subjected to a 36-hour salt spray test so as to evaluate the corrosion resistance of processed portions of the Mg-containing plated steel sheets. (a) illustrates a comparative example, and (b) illustrates an inventive example.

As shown in FIGS. 1(b) and 2(b), the Mg-containing plated steel sheet which was coated according to the present disclosure does not have white rust and surface discoloration and is thus good in appearance.

The invention claimed is:
1. A composition for surface treatment of a Mg-containing galvanized steel sheet, the composition comprising a trivalent chromium compound, a carboxylated vinylidene copolymer, and a crosslinking agent, wherein the carboxylated vinylidene copolymer is included in an amount of 5 wt. % to 10 wt. % based on the composition, wherein the crosslinking agent is included in an amount of 1 wt. % to 5 wt. % based on the weight of the carboxylated vinylidene copolymer, and wherein the trivalent chromium compound is included in an amount of 10 wt. % to 20 wt. % based on the composition.

2. The composition of claim 1, wherein the carboxylated vinylidene copolymer is prepared by copolymerization between a vinylidene-based monomer and a monomer having a carboxyl group.

3. The composition of claim 2, wherein the copolymerization is surfactant-free emulsion copolymerization.

4. The composition of claim 2, wherein the vinylidene-based monomer is included in an amount of 10 wt % to 15 wt % based on the emulsion copolymer material.

5. The composition of claim 2, wherein the monomer having a carboxy group is included in an amount of 0.5 wt % to 1.5 wt % based on the weight of the vinylidene-based monomer.

* * * * *